(12) United States Patent
Zimmer et al.

(10) Patent No.: US 7,134,007 B2
(45) Date of Patent: Nov. 7, 2006

(54) METHOD FOR SHARING FIRMWARE ACROSS HETEROGENEOUS PROCESSOR ARCHITECTURES

(75) Inventors: Vincent J. Zimmer, Federal Way, WA (US); Michael A. Rothman, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 537 days.

(21) Appl. No.: 10/610,606

(22) Filed: Jun. 30, 2003

(65) Prior Publication Data

US 2004/0268107 A1 Dec. 30, 2004

(51) Int. Cl.
G06F 15/177 (2006.01)
G06F 9/24 (2006.01)
G06F 1/24 (2006.01)

(52) U.S. Cl. ............................... 713/1; 713/2; 713/100
(58) Field of Classification Search .................... 713/1, 713/2, 100
See application file for complete search history.

(56) References Cited

U.S. PATENT DOCUMENTS

| 5,604,905 | A | * | 2/1997 | Tevanian et al. ............ 717/140 |
| 5,835,775 | A | * | 11/1998 | Washington et al. ........ 717/153 |
| 6,049,668 | A | * | 4/2000 | Smith et al. ................. 717/138 |
| 6,081,890 | A | * | 6/2000 | Datta ............................. 713/1 |
| 6,216,216 | B1 | * | 4/2001 | Bonola ......................... 712/28 |
| 6,219,828 | B1 | * | 4/2001 | Lee ............................. 717/129 |
| 6,272,453 | B1 | * | 8/2001 | Hoerig et al. ................. 703/27 |
| 6,381,693 | B1 | * | 4/2002 | Fish et al. ...................... 713/1 |
| 6,401,201 | B1 | * | 6/2002 | Fish et al. ...................... 713/2 |
| 6,961,848 | B1 | * | 11/2005 | Fish et al. ...................... 713/2 |
| 2004/0049669 | A1 | * | 3/2004 | Schelling et al. .............. 713/2 |

* cited by examiner

*Primary Examiner*—Thomas Lee
*Assistant Examiner*—Ji H. Bae
(74) *Attorney, Agent, or Firm*—Blakely, Sokoloff, Taylor & Zafman LLP (57) ABSTRACT

A method for sharing firmware across heterogeneous processor architectures. Respective sets of firmware are stored on a platform, including a first set of native firmware designed to execute on a first processor, a second set of native firmware designed to execute on a second processor; and a third set of firmware written in an intermediate language that may be processed via respective virtual machines executing on the first and second processors. The intermediate language is processor instruction set independent, while the native firmware is specific to the instruction sets of each of the first and second processors.

24 Claims, 7 Drawing Sheets

METHOD FOR SHARING FIRMWARE ACROSS HETEROGENEOUS PROCESSOR ARCHITECTURES

FIELD OF THE INVENTION

The field of invention relates generally to computer systems and, more specifically but not exclusively relates to a technique the enables a single set of firmware components to be used by multiple processors having different native instructions sets.

BACKGROUND INFORMATION

As computer server architectures have advanced, more specific functionality have been added to meet customer needs and to increase up time. For example, older computer server architectures might employ a single processor that is use to provide substantially all server functionality via execution of firmware and software instructions on the processor, as well as through specific hardware-level logic built into the processor and/or platform. More recently, the single point of service has been discarded for a more distributed service scheme, whereby multiple processors are employed to perform targeted functions.

For example, modern servers may employ an "out-of-band" management controller that performs separate functions than the servers' primary processor (or processors for multi-processor platforms). Typically, an out-of-band management controller comprises an independent processor, such as a base management controller or service processor, connected to various hardware components of a server platform to monitor the functionality of those hardware components. For instance, a service processor may be configured to have its own independent link to a network with an independent Internet protocol ("IP") address to allow an administrator on a remote console to monitor the functionality of the server. As used herein, these processors are collectively termed "co-processors."

Figure 1:
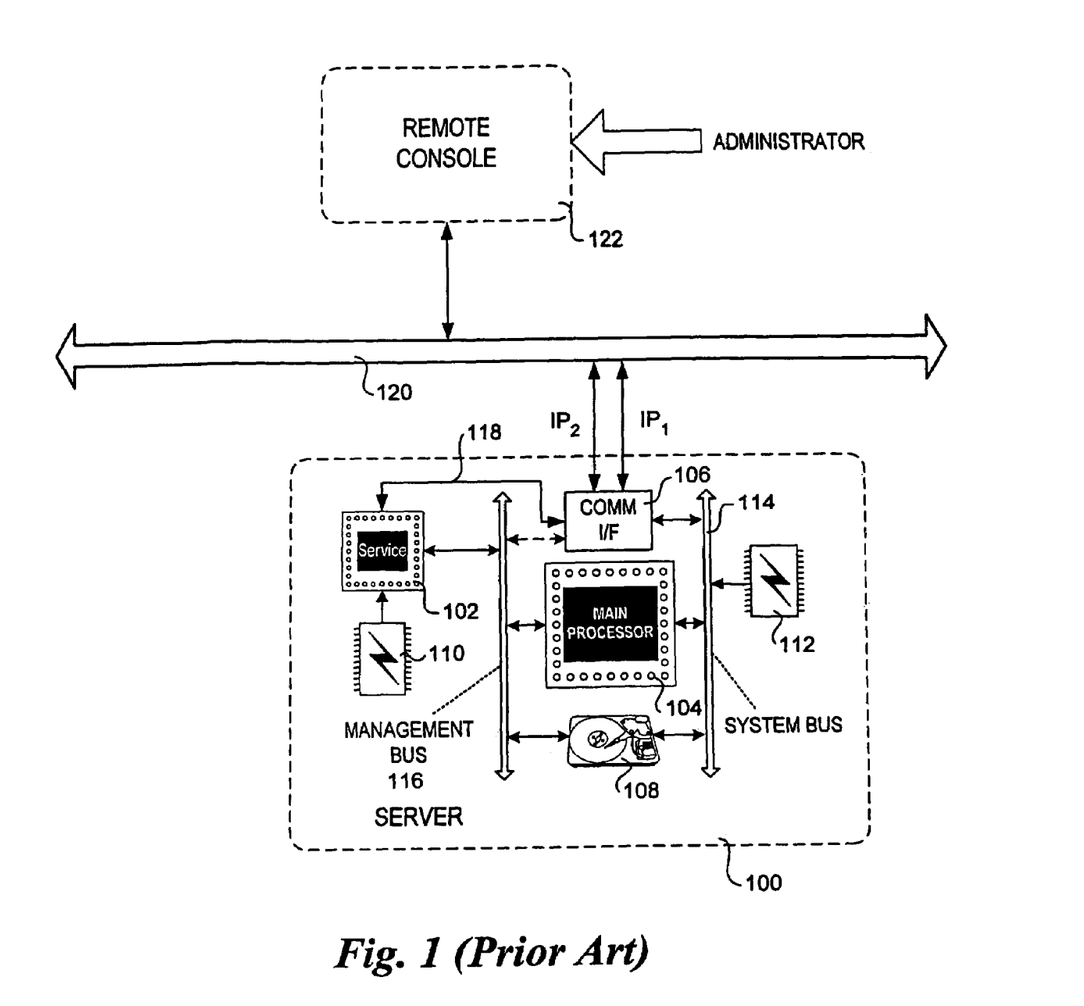
FIG. 1 is a schematic diagram illustrating a conventional server employing a main processor and a service co-processor.

With reference to FIG. 1, a server 100 having a conventional service processor configuration known in the art is depicted. The illustrated embodiment of server 100 includes a service processor 102, a main processor (CPU) 104, a communication interface 106, a data storage unit 108, a service processor firmware storage device 110, and a platform firmware storage device 112. Main processor 104 is communicatively coupled to various platform components via one or more buses that are collectively illustrated as a system bus 114. Typically, service processor 102 is coupled to the same and/or different platform components via an independent bus and/or direct channels, also called service channels; this bus or buses is depicted in FIG. 1 as a management bus 116. In one embodiment, service processor 102 is communicatively-coupled to communication interface 106 via a separate channel 118. Optionally, the coupling may be implemented via management bus 116.

Generally, service processor 102 may be linked in communication with a network 120 via either communication interface 106 or a dedicated network interface. In the illustrated embodiment, communication interface 106 provides two ports with respective IP addresses of $IP_1$ and $IP_2$, whereby one IP address may be used by main processor 104, while the other may be used by service processor 102

An administrator working on a remote console 122 coupled to network 120 can monitor the functionality of main processor 104, data storage unit 108, or other entities (not shown) via interaction with service processor 102. The functions of service processor 102 generally include monitoring one or more characteristics or operations of main processor 104 (e.g., monitoring the temperature of processor 104), data storage unit 108, and other hardware components (not shown), recording hardware errors, performing manual tasks initiated by the administrator (such as resetting main processor 104), recovering main processor 104 after an error, performing manual input/output data transfers, and the like.

The foregoing service processor functions are enabled via execution of firmware stored in service processor firmware storage device 110. In particular, interaction with the various hardware components is provided via one or more corresponding firmware drivers. At the same time, separate firmware drivers stored in platform firmware storage device 112 are employed by main processor 104 to access the same hardware components. Since main processor 104 and service processor 102 will generally employ different instructions sets, the firmware drivers for the respective processors are often developed by independent groups.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION OF PREFERRED EMBODIMENTS

Embodiments of methods and apparatus for sharing firmware across heterogeneous processor architectures are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the invention, a scheme is provided that enables sharing of firmware across heterogeneous processors (i.e., processors that employ different native instruction sets). This is facilitated, in part, by using a shared set of firmware drivers written in an intermediate language comprising interpreted byte code so as to be executable on a corresponding byte code interpreter embodied as a virtual machine. Thus, a set of common binary drivers may be shared by at least two different processors having different Instruction Set Architectures (ISA's). In fact, not only can the instruction sets for the processors differ, the ISA bit-width of the processors need not match.

Figure 2:
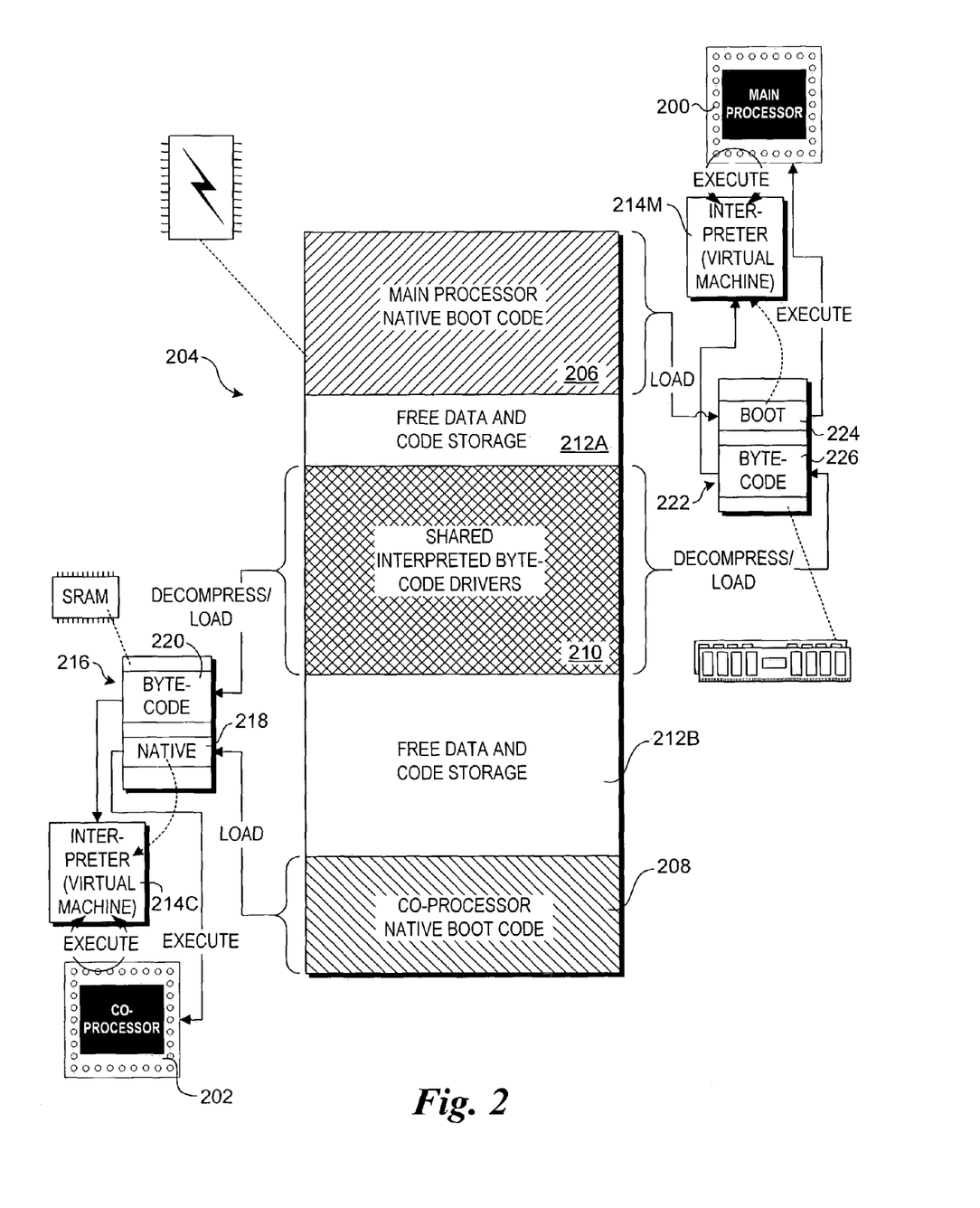
FIG. 2 is a schematic diagram illustrating a shared interpreted byte code firmware storage, load and execution scheme, according to one embodiment of the invention.

An exemplary shared firmware storage and execution scheme in accordance with one embodiment is shown in FIG. 2. Various firmware components for a platform employing a main processor 200 having a first ISA and a co-processor 202 having a second ISA are stored in a firmware device 204, such as a flash device. The firmware components are logically divided into three sets: 1) main processor native boot code 206; 2) co-processor native boot code 208; and 3) shared interpreted byte-code drivers 210. Portions 212A and 212B may be further provided to store various firmware data and code—these portions are free in the illustrated embodiment.

Main processor native boot code 206 and co-processor native boot code 208 are used to perform early initialization (i.e. boot) of main processor 200 and co-processor 202, respectively. Furthermore, each of these sets of code are ISA-dependent on their respective processors—in other words, they are written to be executed directly by their processors using the processors'native modes. In contrast, shared interpreted byte code drivers 210 are written in an intermediate language comprising instructions that are not designed to be executed directly in a native mode of either main processor 200 or co-processor 202. Rather, in one embodiment they are written in an interpreted byte-code language that may be executed by byte-code interpreters 214M and 214C embodied as a "virtual machines" that execute on main processor 200 and co-processor 202, respectively.

Figure 3:
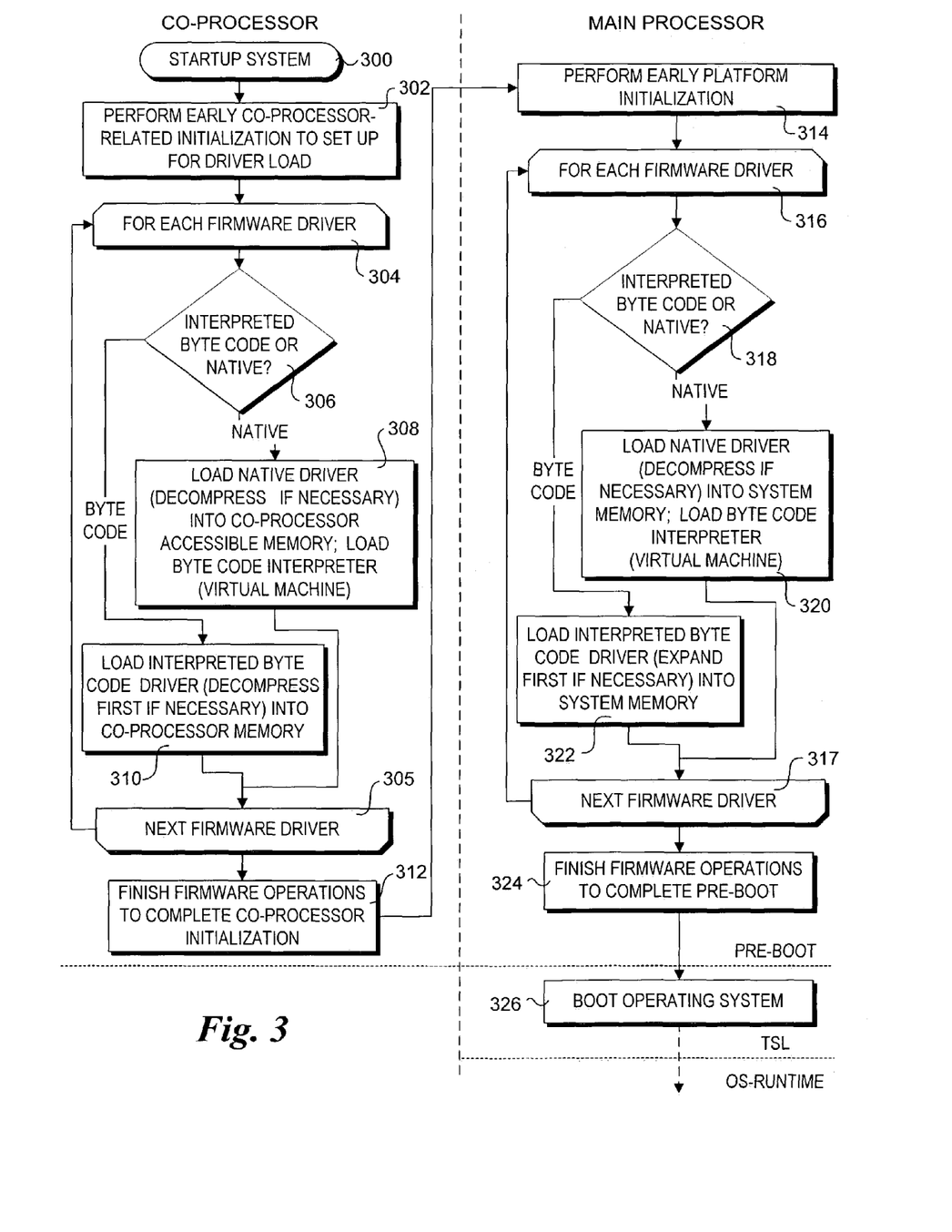
FIG. 3 is a flowchart illustrating operations and logic performed in connection with a platform initialization process.

With further reference to the flowchart of FIG. 3, the various firmware components are initialized and loaded in the following manner. The process begins in a start block 300, which corresponds to a system start up event, such as a power-on event or a system reset. In response to the event, early co-processor-related initialization is performed in a block 302. Further details of this process are described below.

The next set of operations, as delineated by start and end loop blocks 304 and 305, are performed for each firmware driver that is found. First, a determination is made in a decision block 306 to whether the firmware driver is written in interpreted byte code or native code for co-processor 202. For example, in one embodiment information is contained in a header of each firmware driver indicating what type of driver (native or byte-code) it is. If the firmware driver is written in native code, an image of the driver is copied and loaded into co-processor-memory 216 (i.e., memory that is accessible to a co-processor, such as a separate memory device or built-in memory) in a block 308. In some cases, the firmware driver may be stored in a compressed form. In these instances, the image for the driver is first decompressed and loaded into memory 216. One of the first native drivers to be loaded is byte code interpreter 214C, which is employed for interpreting subsequently-loaded byte code drivers during both the pre-boot and operating system runtime phases. The loaded images for these drivers are depicted as native drivers images 218.

If the firmware driver is written in byte code, the logic flows to a block 310, wherein images of these drivers are also loaded into co-processor memory 216. In one embodiment, all shared interpreted byte-code drivers 210 are stored in a compressed form. Accordingly, the images are first decompressed and then copied into co-processor memory 216. The loaded driver images are shown as byte-code driver images 220.

After all of the firmware drivers have been loaded, additional firmware operations are performed, as necessary, to complete initialization of co-processor 202. This is depicted in a block 312.

Next, initialization of main processor 200 is performed. In a block 314 early platform initialization operations are performed, as described below with reference to FIG. 4. In next set of operations are performed for each firmware driver, as delineated by start and end loop blocks 316 and 317. First, a determination in a decision block 318 to whether the firmware driver is written in interpreted byte code or native code for main processor 200. If the firmware driver is written in native code, an image of the driver is copied and loaded into system memory 222 in a block 320. As before, if the driver is stored in a compressed form, it is decompressed to produce the image. Also as before, one of the first native drivers to be loaded comprises byte code interpreter 214M. The loaded images are shown as native drivers images 224.

If the firmware driver is written in byte code, the logic flows to a block 322, wherein images of these drivers are also loaded into system memory 222, using decompression, if appropriate. The loaded images are shown as byte-code driver images 226.

Once all of the firmware drivers have been loaded, the logic proceeds to a block 324 in which remaining firmware operations a performed to complete the pre-boot phase for the platform. The operating system is then booted in a block 326, leading to operating system runtime.

In accordance with one embodiment, the shared interpreted byte-code firmware architecture may be implemented under an extensible firmware framework known as the Extensible Firmware Interface (EFI) (specifications and examples of which may be found at http://developer.intel.com/technology/efi). EFI is a public industry specification that describes an abstract programmatic interface between platform firmware and shrink-wrap operation systems or other custom application environments. The EFI framework include provisions for extending BIOS functionality beyond that provided by the BIOS code stored in a platform's BIOS device (e.g., flash memory). More particularly, EFI enables firmware, in the form of firmware modules and drivers, to be loaded from a variety of different resources, including primary and secondary flash devices, option ROMs, various persistent storage devices (e.g., hard disks, CD ROMs, etc.), and even over computer networks.

Figure 4:
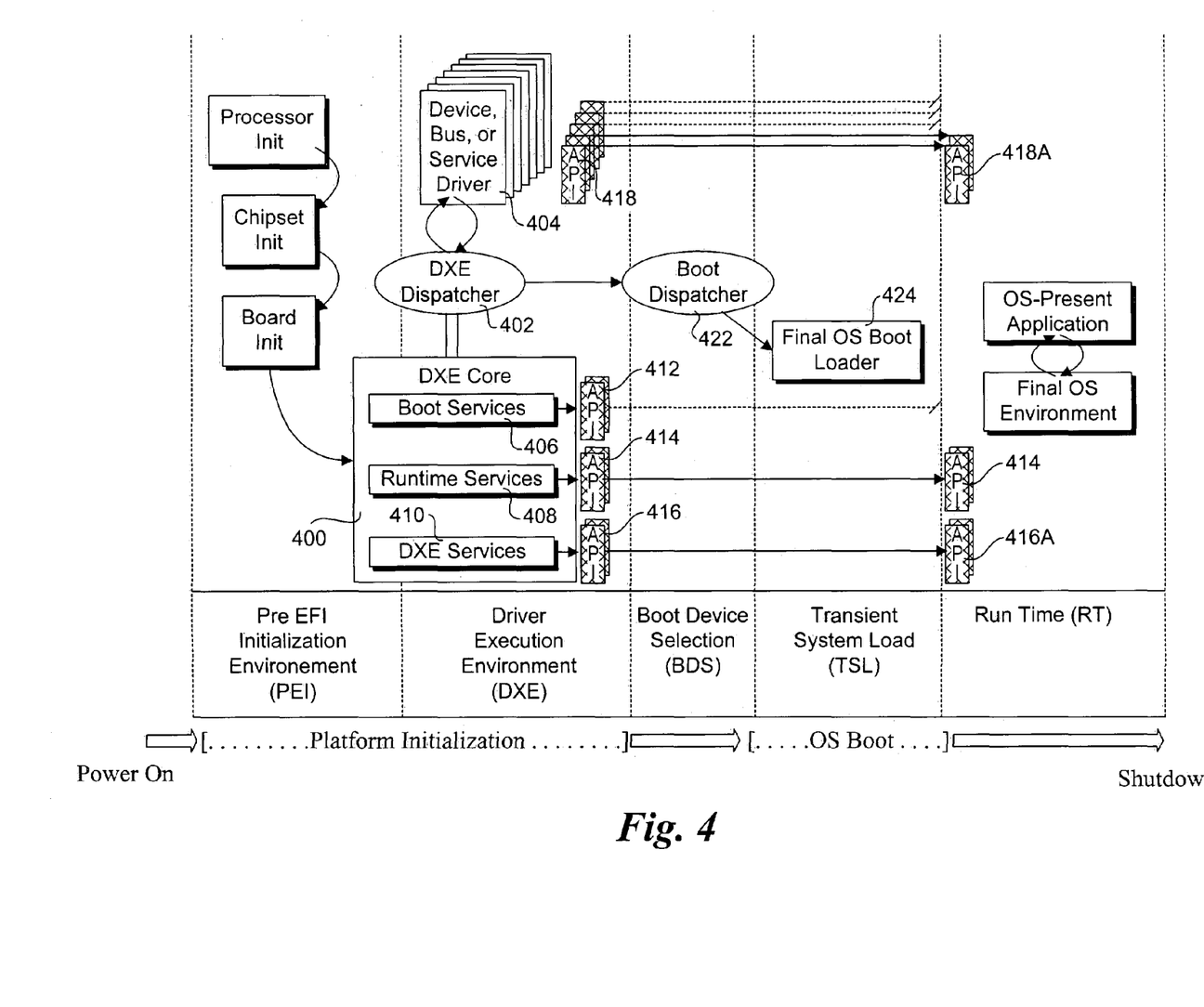
FIG. 4 is a is a schematic diagram illustrating the various execution phases that are performed in accordance with the extensible firmware interface (EFI) framework under which the operations of the platform initialization process of FIG. 3 may be performed, according to one embodiment of the invention.

FIG. 4 shows an event sequence/architecture diagram used to illustrate operations performed by a platform under the framework in response to a restart event. While shown to illustrate initialization of a platform with a processor, the framework may be employed for initializing co-processors and related circuitry as well. The process is logically divided into several phases, including a pre-EFI Initialization Environment (PEI) phase, a Driver Execution Environment (DXE) phase, a Boot Device Selection (BDS) phase, a Transient System Load (TSL) phase, and an operating system runtime (RT) phase. The phases build upon one another to provide an appropriate run-time environment for the OS and platform.

The PEI phase provides a standardized method of loading and invoking specific initial configuration routines for the processor, chipset, and motherboard. For a co-processor, similar operations are performed in accordance with the particular hardware architecture for the system relating to the co-processor. The PEI phase is responsible for initializing enough of the system to provide a stable base for the follow on phases. Initialization of the platforms core components, including the CPU, chipset and main board (i.e., motherboard) is performed during the PEI phase. This phase is also referred to as the "early initialization" phase. Typical operations performed during this phase include the POST (power-on self test) operations, and discovery of platform resources. In particular, the PEI phase discovers memory and prepares a resource map that is handed off to the DXE phase. The state of the system at the end of the PEI phase is passed to the DXE phase through a list of position independent data structures called Hand Off Blocks (HOBs).

The DXE phase is the phase during which most of the system initialization is performed. The DXE phase is facilitated by several components, including the DXE core 400, the DXE dispatcher 402, and a set of DXE drivers 404. The DXE core 400 produces a set of Boot Services 406, Runtime Services 408, and DXE Services 410. The DXE dispatcher 402 is responsible for discovering and executing DXE drivers 104 in the correct order. The DXE drivers 404 are responsible for initializing the processor, chipset, and platform components as well as providing software abstractions for console and boot devices. These components work together to initialize the platform and provide the services required to boot an operating system. In one embodiment, shared interpreted byte-code drivers 210 comprise DXE drivers. The DXE and the Boot Device Selection phases work together to establish consoles and attempt the booting of operating systems. The DXE phase is terminated when an operating system successfully begins its boot process (i.e., the BDS phase starts). Only the runtime services and selected DXE services provided by the DXE core and selected services provided by runtime DXE drivers are allowed to persist into the OS runtime environment. The result of DXE is the presentation of a fully formed EFI interface.

The DXE core is designed to be completely portable with no CPU, chipset, or platform dependencies. This is accomplished by designing in several features. First, the DXE core only depends upon the HOB list for its initial state. This means that the DXE core does not depend on any services from a previous phase, so all the prior phases can be unloaded once the HOB list is passed to the DXE core. Second, the DXE core does not contain any hard coded addresses. This means that the DXE core can be loaded anywhere in physical memory, and it can function correctly no matter where physical memory or where Firmware segments are located in the processor's physical address space. Third, the DXE core does not contain any processor-specific, chipset specific, or platform specific information. Instead, the DXE core is abstracted from the system hardware through a set of architectural protocol interfaces. These architectural protocol interfaces are produced by DXE drivers 404, which are invoked by DXE Dispatcher 402.

Figure 5:
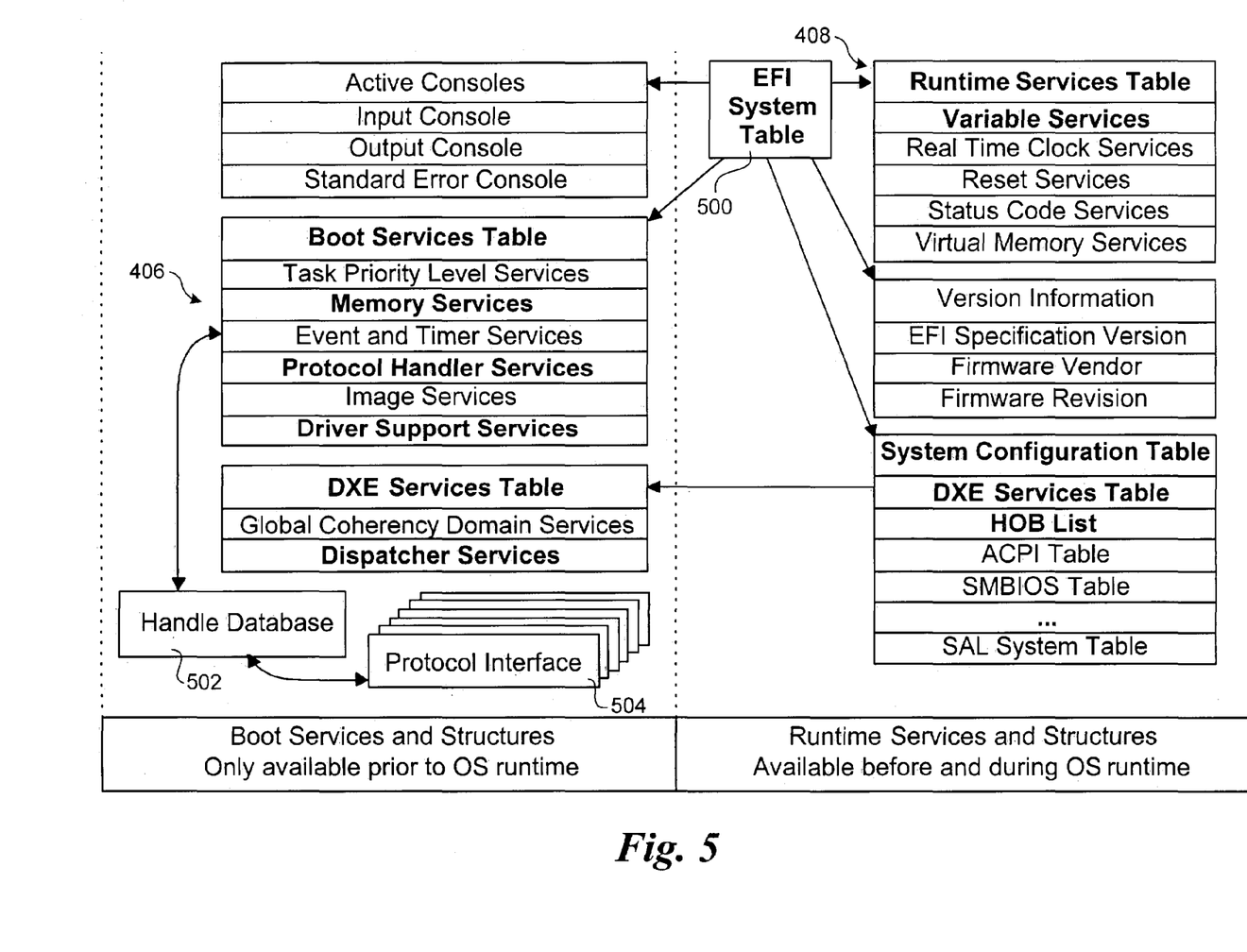
FIG. 5 is a block schematic diagram illustrating various components of the EFI system table corresponding to the EFI framework.

The DXE core produces an EFI System Table 500 and its associated set of Boot Services 406 and Runtime Services 408, as shown in FIG. 5. The DXE Core also maintains a handle database 502. The handle database comprises a list of one or more handles, wherein a handle is a list of one or more unique protocol GUIDs (Globally Unique Identifiers) that map to respective protocols 504. A protocol is a software abstraction for a set of services. Some protocols abstract I/O devices, and other protocols abstract a common set of system services. A protocol typically contains a set of APIs and some number of data fields. Every protocol is named by a GUID, and the DXE Core produces services that allow protocols to be registered in the handle database. As the DXE Dispatcher executes DXE drivers, additional protocols will be added to the handle database including the architectural protocols used to abstract the DXE Core from platform specific details.

The Boot Services comprise a set of services that are used during the DXE and BDS phases. Among others, these services include Memory Services, Protocol Handler Services, and Driver Support Services: Memory Services provide services to allocate and free memory pages and allocate and free the memory pool on byte boundaries. It also provides a service to retrieve a map of all the current physical memory usage in the platform. Protocol Handler Services provides services to add and remove handles from the handle database. It also provides services to add and remove protocols from the handles in the handle database. Addition services are available that allow any component to lookup handles in the handle database, and open and close protocols in the handle database. Support Services provides services to connect and disconnect drivers to devices in the platform. These services are used by the BDS phase to either connect all drivers to all devices, or to connect only the minimum number of drivers to devices required to establish the consoles and boot an operating system (i.e., for supporting a fast boot mechanism).

The DXE Services Table includes data corresponding to a first set of DXE services 506A that are available during pre-boot only, and a second set of DXE services 506B that are available during both pre-boot and OS runtime. The pre-boot only services include Global Coherency Domain Services, which provide services to manage I/O resources, memory mapped I/O resources, and system memory resources in the platform. Also included are DXE Dispatcher Services, which provide services to manage DXE drivers that are being dispatched by the DXE dispatcher.

The services offered by each of Boot Services 406, Runtime Services 408, and DXE services 410 are accessed via respective sets of API's 412, 414, and 416. The API's provide an abstracted interface that enables subsequently loaded components to leverage selected services provided by the DXE Core.

After DXE Core 400 is initialized, control is handed to DXE Dispatcher 402. The DXE Dispatcher is responsible for loading and invoking DXE drivers found in firmware volumes, which correspond to the logical storage units from which firmware is loaded under the EFI framework. The DXE dispatcher searches for drivers in the firmware volumes described by the HOB List. As execution continues, other firmware volumes might be located. When they are, the dispatcher searches them for drivers as well.

There are two subclasses of DXE drivers. The first subclass includes DXE drivers that execute very early in the DXE phase. The execution order of these DXE drivers depends on the presence and contents of an a priori file and the evaluation of dependency expressions. These early DXE drivers will typically contain processor, chipset, and platform initialization code. These early drivers will also typically produce the architectural protocols that are required for the DXE core to produce its full complement of Boot Services and Runtime Services. In one embodiment, the native drivers fall into this subclass.

The second subclass of DXE drivers are those that comply with the EFI 1.10 Driver Model. These drivers do not perform any hardware initialization when executed by the DXE dispatcher. Instead, they register a Driver Binding Protocol interface in the handle database. The set of Driver Binding Protocols are used by the BDS phase to connect the drivers to the devices required to establish consoles and provide access to boot devices. The DXE Drivers that comply with the EFI 1.10 Driver Model ultimately provide software abstractions for console devices and boot devices when they are explicitly asked to do so. Typically, shared interpreted byte-code drivers 206 ball unto the second subclass; however, the byte-code drivers may be employed for both subclasses as well.

Any DXE driver may consume the Boot Services and Runtime Services to perform their functions. However, the early DXE drivers need to be aware that not all of these services may be available when they execute because all of the architectural protocols might not have been registered yet. DXE drivers must-use dependency expressions to guarantee that the services and protocol interfaces they require are available before they are executed.

The DXE drivers that comply with the EFI 1.10 Driver Model do not need to be concerned with this possibility. These drivers simply register the Driver Binding Protocol in the handle database when they are executed. This operation can be performed without the use of any architectural protocols. In connection with registration of the Driver Binding Protocols, a DXE driver may "publish" an API by using the InstallConfigurationTable function. This published drivers are depicted by API's 418. Under EFI, publication of an API exposes the API for access by other firmware components. The API's provide interfaces for the Device, Bus, or Service to which the DXE driver corresponds during their respective lifetimes.

The BDS architectural protocol executes during the BDS phase. The BDS architectural protocol locates and loads various applications that execute in the pre-boot services environment. Such applications might represent a traditional OS boot loader, or extended services that might run instead of, or prior to loading the final OS. Such extended pre-boot services might include setup configuration, extended diagnostics, flash update support, OEM value-adds, or the OS boot code. A Boot Dispatcher 420 is used during the BDS phase to enable selection of a Boot target, e.g., an OS to be booted by the system.

During the TSL phase, a final OS Boot loader 422 is run to load the selected OS. Once the OS has been loaded, there is no further need for the Boot Services 406, and for many of the services provided in connection with DXE drivers 404 via API's 418, as well as DXE Services 506A. Accordingly, these reduced sets of API's that may be accessed during OS runtime are depicted as API's 416A, and 418A in FIG. 1.

Figure 6:
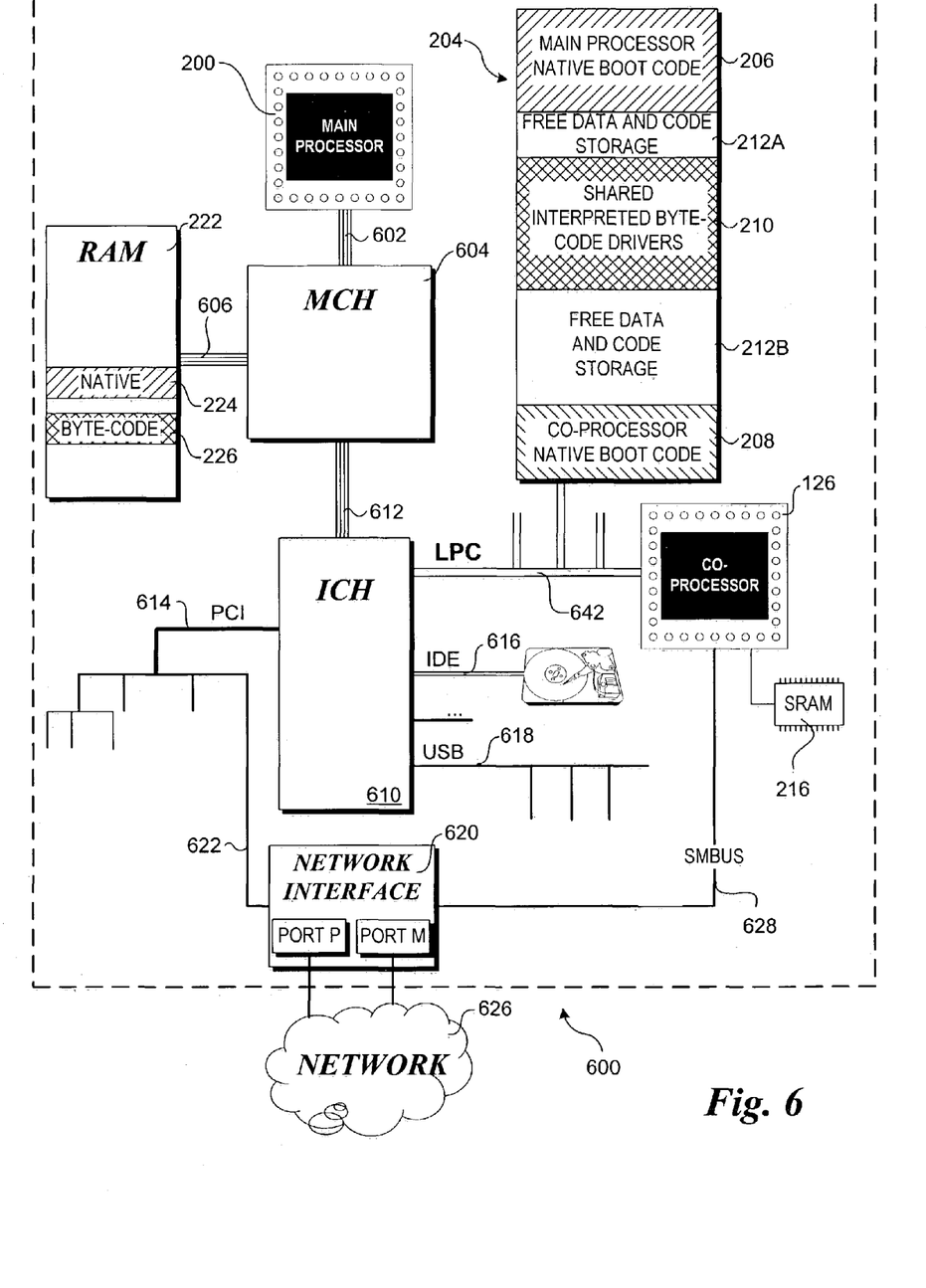
FIG. 6 is a schematic diagram of a platform architecture via which embodiments of the invention may be implemented.

An exemplary platform architecture 600 that may be employed for implementing embodiments of the invention is shown in FIG. 6. Platform architecture 600 includes a main processor 200 coupled, via a bus 602, to a memory controller hub (MCH) 604, commonly referred to as the "Northbridge" under well- known Intel® chipset schemes. MCH 604 is coupled via a bus 606 to system memory (i.e., RAM) 222. MCH 604 is further coupled to an Input/Output (I/O) controller hub (ICH) 610 via a bus 612. The ICH, which is commonly referred to as the "Southbridge," provides a hardware interface to various I/O buses, ports and devices. These include a PCI bus 614, an IDE interface 616, a universal serial bus (USB) 618, etc. ICH 610 is further coupled to a network interface 620 via an I/O path 622. In the illustrated embodiment, I/O path 622 is coupled to PCI bus 614.

Firmware storage device 204 and co-processor 202 are communicatively coupled to ICH 610 via a low pin count (LPC) bus 624 configured per Intel LPC Interface Specification Revision 1.0, Sep. 29, 1997. Co-processor memory 216 is also coupled to co-processor 202. In one embodiment, co-processor memory 216 comprises a static RAM (SRAM) device.

As discussed above, each of a platform's processors (i.e., main processor 200 and co-processor 202) will have a respective IP address reserved for external communication purposes, such as accessing a network 626. Several network interface controllers (NIC) manufactured by Intel® provide dual network ports having respective IP addresses. In one embodiment, an Intel® 82559 NIC is employed for network interface 620. This NIC provides a primary port that operates in a conventional manner (e.g., configured to interface with ICH 610), and a management port that is configured to interface with system management components, such as co-processor 202. These ports are shown as a port P (for "P"rimary) and a port M (for "M"anagement). In one embodiment, communication between the management port M of network interface 620 and co-processor 202 is hosted by a system management bus (SMBUS) 628. Details of the operation of an SMBUS are disclosed at www.SMBUS.org.

In one embodiment, shared interpreted byte-code drivers 210 are written in an interpreted byte code known as EFI Byte Code (EBC). The EBC instructions are interpreted "on the fly" by an EBC virtual machine. In this embodiment, each of byte code interpreters 214C and 214M are embodied as EBC virtual machines. An EBC virtual machine provides an abstraction between platform-independent EBC instructions, and ISA-specific processor architectures. This includes processors having different instruction widths (e.g., 32-bit, 64-bit, etc.). Thus, the same set of interpreted byte code may be used for many different types of processors, in conjunction with virtual machines configured for the ISA's of the processors.

The EBC comprises a pre-defined set of instructions that may be generated with an EBC C compiler. Details of the instruction set and EBC virtual machine are presented in chapter 19 ("EFI Byte Code Virtual Machine") of the EFI 1.10 specification, Dec. 1,2002. An EBC image may be placed any system memory area large enough to accommodate it. Furthermore, the EFI framework discussed above is configured to work with firmware drivers written in EBC.

During OS-runtime, both native and byte-code drivers are initially handled in the same manner. That is, a service request is made through a corresponding API from another firmware or software component. For example, in a typical case involving a single firmware driver used to service a corresponding peripheral device (e.g., modem, sound card, USB, etc.), a software driver in the operation system will request service from the firmware driver via an API that is handed off to the OS when it is booted. In response to the service request, the driver header is read, which identifies whether the driver comprises native instructions or intermediate language instructions (e.g., EBC). If the driver comprises native instructions, the instructions are passed to the processor for execution. If the instructions comprise intermediate language instructions, the instructions are passed to an appropriate virtual machine running on the processor for processing.

Figure 7:
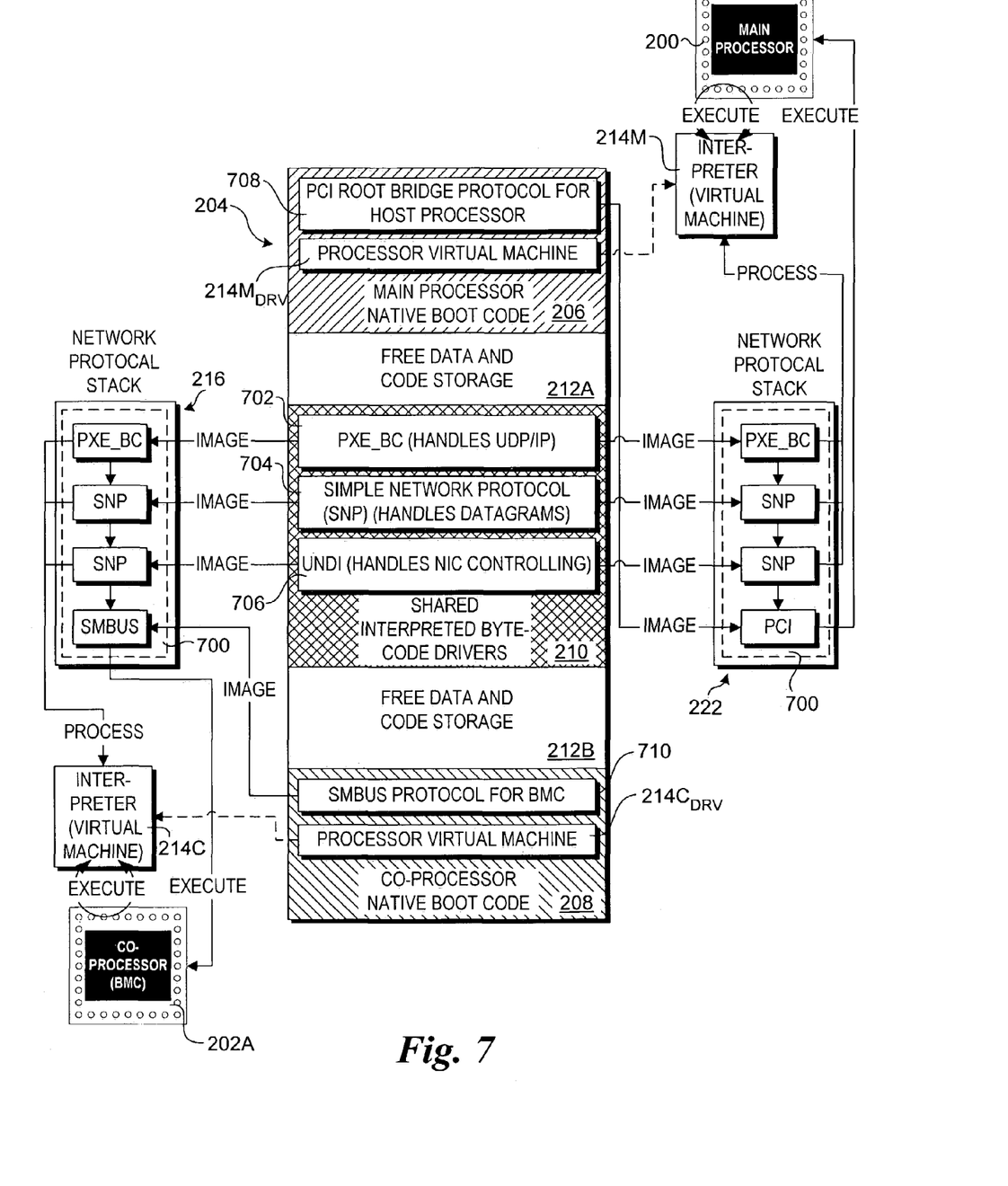
FIG. 7 is a schematic diagram illustrating the use of a combination of shared drivers and native drivers to facilitate network communications.

In addition to servicing peripheral devices and platform components via single native and intermediate language drivers, a combination of driver types may be used to service a device or component. For example, FIG. 7 illustrates a scheme for servicing network communication operations, wherein the operations corresponding to different layers of a network protocol stack are services by respective drivers. More specifically, the firmware components are configured to support the platform architecture of FIG. 6, wherein network communication is facilitated by network interface 620. In addition, the platform co-processor comprises a baseboard management controller (BMC) 202A.

Services supporting the top three layers of a network protocol stack 700, namely UDP/IP (User Datagram Protocol/Internet Protocol), Simple Network Protocol (SNP) and UNDI (Universal Network Device Interface) are provided by a PXE_BC shared driver 702, an SNP shared driver 704, and a UNDI shared driver 706. Services supporting the bottom layer of the stack, which corresponds to network device-to-platform communication, are provided by a PCI main processor native driver 708 that facilitates communication to main processor 200 via PCI bus 614, and an SMBUS co-processor native driver 710 that facilitates communication with BMC 202A via SMBUS 628.

During pre-boot, main processor native boot code 206 is loaded into system memory 222 (or directly executed prior to memory availability). This includes loading processor native driver images including PCI processor native driver 708 and a processor virtual machine driver $214M_{DRV}$. Images of each of shared drivers 702, 704, and 708 are also loaded into system memory 222. Meanwhile, co-processor native boot code 208 is loaded into co-processor memory 216 (or directly executed prior to memory availability). This includes loading co-processor native driver images including SMBUS co-processor native driver 710 and a co-processor virtual machine driver $214C_{DRV}$. Images of each of shared drivers 702, 704, and 708 are also loaded into co-processor memory 216.

During OS runtime, a service request for network communications is handled via processing of instructions contained in the images of shared firmware drivers 702, 704, and 708 on the virtual machine corresponding to the processor handling the service request, in combination with direct execution of the native network device-to-platform communication driver instructions for the processor. For example, if the network service is provided by BMC 202A, an image of SMBUS co-processor native driver 710 would be executed on BMC 202A to service the request (in conjunction with processing of the instructions for shared firmware drivers 702, 704, and 708 on virtual machine 214C to handle the higher layer in network protocol stack 700.

In general, the operations performed by the embodiments of the invention disclosed herein result from execution and/or processing of firmware instructions by a corresponding machine (i.e. a processor or virtual machine running on a processor). The firmware instructions may comprise native machine code and/or intermediate language code that is processed by a virtual machine that in turn is executed via native machine code. Thus, embodiments of this invention may be used as or to support coded instructions executed upon some form of processing core (such as a main and co-processor) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method comprising:
    loading a first image of shared firmware to be accessible to a first processor having a first instruction set architecture (ISA);
    loading a second image of the shared firmware to be accessible to a second processor having a second ISA different than the first ISA, wherein the first processor comprises a main processor for a computing platform and the second processor comprises a co-processor for the computing platform;
    processing instructions from the first image of the shared firmware via a first virtual machine executing on the first processor; and
    processing instructions from the second image of the shared firmware via a second virtual machine executing on the second processor.

2. The method of claim 1, wherein the shared firmware comprises interpreted byte code instructions.

3. The method of claim 1, wherein the co-processor comprises a service processor.

4. The method of claim 1, wherein the co-processor comprises a baseboard management controller.

5. The method of claim 1, wherein the first processor and the second processor have respective first and second ISA's with different bit widths.

6. The method of claim 1, wherein the shared firmware comprises at least one firmware driver.

7. The method of claim 1, further comprising:
    loading a first set of native firmware code to be accessible to the first processor; and
    loading a second set of native firmware code to be accessible to the second processor.

initializing the first processor and components related thereto via the first set of native firmware code; and
initializing the second processor and components related thereto via the second set of native firmware code.

8. The method of claim 7, wherein the first set of native firmware code includes a native firmware driver and a portion of the shared firmware includes a shared non-native firmware driver, the method further comprising employing the native firmware driver and the shared non-native, firmware driver to service a device.

9. A method comprising:
loading a first image of shared firmware to be accessible to a first processor having a first instruction set architecture (ISA);
loading a second image of the shared firmware to be accessible to a second processor having a second ISA different than the first ISA:
processing instructions from the first image of the shared firmware via a first virtual machine executing on the first processor; and
processing instructions from the second image of the shared firmware via a second virtual machine executing on the second processor.
wherein the shared firmware comprises at least one firmware driver, and wherein said at least one firmware driver includes a communications driver.

10. The method of claim 9, wherein said at least one firmware driver includes a plurality of communication drivers corresponding to respective layers in a network protocol stack.

11. A method comprising:
loading a first image of shared firmware to be accessible to a first processor having a first instruction set architecture (ISA);
loading a second image of the shared firmware to be accessible to a second processor having a second ISA different than the first ISA;
processing instructions from the first image of the shared firmware via a first virtual machine executing on the first processor; and
processing instructions from the second image of the shared firmware via a second virtual machine executing on the second processor.
wherein the shared firmware comprises at least one firmware driver, and wherein said at least one firmware driver is compliant with the Extensible Firmware Interface (EFI) Framework.

12. The method of claim 11, wherein said at least one firmware driver comprises interpreted byte code instructions written in EFI byte code (EBC) and said first and second virtual machines comprise EBC virtual machines.

13. A method comprising:
storing a first set of native firmware code in a firmware storage device, said first set of native firmware code including instructions to be executed on a first processor have a first instruction set architecture (ISA);
storing a second set of native firmware code in the firmware storage device, said second set of native firmware code including instructions to be executed on a second processor have a second ISA different than the first ISA; and
storing shared firmware comprising instructions to be executed via each of said first and second processors,
wherein the first set of native firmware code includes instructions comprising a first virtual machine to be executed on the first processor to interpret interpreted byte code instructions and the second set of native firmware code includes instructions comprising a second virtual machine to be executed on the second processor to interpret interpreted byte code instructions, and
wherein the instructions comprising the first and second virtual machines are firmware drivers.

14. The method of claim 13, wherein the shared firmware comprises interpreted byte code instructions.

15. The method of claim 13, wherein the firmware drivers are compliant with the Extensible Firmware Interface (EFI) Framework.

16. A machine-readable storage device having respective sets of firmware instructions stored thereon, including:
a first set of native firmware instructions to execute on a first processor having a first instruction set architecture (ISA);
a second set of native firmware instructions to execute on a second processor having a second (ISA) different than the first ISA; and
shared firmware instructions comprising an intermediate language to be executed via virtual machines running on each of the first and second processors,
wherein the first set of native firmware instructions includes instructions embodied as a first virtual machine to process the shared firmware instructions via the first processor and the second set of native firmware instructions includes instructions embodied as a second virtual machine to process the shared firmware instructions via the second processor, and
wherein the first and second virtual machines are firmware drivers compatible with the Extensible Firmware Interface framework.

17. The medium of claim 16, wherein the machine-readable storage device comprises a firmware storage device machine readable.

18. The machine-readable storage device of claim 16, wherein the intermediate language comprises an interpreted byte code.

19. A system comprising:
a first processor having a first instruction set architecture (ISA);
a second processor having a second ISA different from the first ISA, wherein the first processor comprises a main processor for the system and the second processor comprises a co-processor for the system;
a firmware storage device, communicatively coupled to each of the first and second processors, having respective sets of firmware instructions stored thereon, including:
a first set of native firmware instructions to execute on the first processor;
a second set of native firmware instructions to execute on the second processor; and
shared firmware instructions comprising an intermediate language to be executed via virtual machines to run on each of the first and second processors.

20. The system of claim 19, wherein the co-processor comprises a service processor.

21. A system comprising:
a first processor having a first instruction set architecture (ISA);

a second processor having a second ISA different from the first ISA;

a firmware storage device, communicatively coupled to each of the first and second processors, having respective sets of firmware instructions stored thereon, including:

a first set of native firmware instructions to execute on the first processor;

a second set of native firmware instructions to execute on the second processor;

shared firmware instructions comprising an intermediate language to be executed via virtual machines to run on each of the first and second processors; and a peripheral device communicatively coupled to each of the first and second processors, and wherein the shared firmware instructions comprise at least one firmware driver to service the peripheral device.

22. The system of claim 21, wherein the peripheral device comprises a network interface controller (NIC).

23. The system of claim 22, wherein the second processor is communicatively coupled to the NIC via a system management bus (SMBUS).

24. The system of claim 21, wherein the first processor has a 64-bit ISA and the second processor a 32-bit ISA.

* * * * *